United States Patent
Kim et al.

(10) Patent No.: US 7,910,818 B2
(45) Date of Patent: Mar. 22, 2011

(54) SYSTEM AND METHOD FOR PROVIDING AN EDUTAINMENT INTERFACE FOR MUSICAL INSTRUMENTS

(75) Inventors: Jieun Kim, Glendale, CA (US); Jon Guerra, Altadena, CA (US); Jr Desouza, La Cañada, CA (US); Chris Heatherly, Monrovia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 155 days.

(21) Appl. No.: 12/315,749

(22) Filed: Dec. 3, 2008

(65) Prior Publication Data
US 2010/0137048 A1 Jun. 3, 2010

(51) Int. Cl.
G09B 15/00 (2006.01)
G09B 15/02 (2006.01)
G10H 1/00 (2006.01)

(52) U.S. Cl. ...... 84/477 R; 84/470 R; 84/478; 84/483.2; 84/485 R (58) Field of Classification Search .......... None
See application file for complete search history.

(56) References Cited

U.S. PATENT DOCUMENTS

| | | | |
|---|---|---|---|
| 5,183,398 A | 2/1993 | Monte | |
| 5,270,475 A | 12/1993 | Weiss | |
| 6,162,981 A * | 12/2000 | Newcomer et al. | 84/485 R |
| 6,995,310 B1 | 2/2006 | Knapp | |
| 7,459,624 B2 * | 12/2008 | Schmidt et al. | 84/477 R |
| 7,625,284 B2 * | 12/2009 | Kay et al. | 463/31 |
| 2004/0137984 A1 | 7/2004 | Salter | |
| 2006/0191399 A1 * | 8/2006 | Miyaki | 84/613 |
| 2007/0234885 A1 * | 10/2007 | Schmidt et al. | 84/722 |
| 2007/0256540 A1 * | 11/2007 | Salter | 84/485 R |
| 2007/0256551 A1 * | 11/2007 | Knapp et al. | 84/722 |
| 2008/0028920 A1 | 2/2008 | Sullivan | |
| 2008/0113797 A1 | 5/2008 | Egozy | |
| 2009/0064849 A1 * | 3/2009 | Festejo | 84/485 R |
| 2009/0100991 A1 * | 4/2009 | Lazovic | 84/645 |
| 2009/0178544 A1 * | 7/2009 | Reynolds et al. | 84/610 |
| 2009/0235808 A1 * | 9/2009 | Salter | 84/485 R |
| 2009/0288547 A1 * | 11/2009 | Lazovic | 84/645 |

FOREIGN PATENT DOCUMENTS

| | | |
|---|---|---|
| WO | WO 94/11857 | 5/1994 |
| WO | WO 2007/124387 | 11/2007 |
| WO | WO 2008/097919 | 8/2008 |

OTHER PUBLICATIONS

Percival, et al., "Effective Use of Multimedia for Computer-Assisted Musical Instrument Tutoring", EMME'07, Sep. 28, 2007.

* cited by examiner

*Primary Examiner* — Marlon T Fletcher
(74) *Attorney, Agent, or Firm* — Farjami & Farjami LLP (57) ABSTRACT

There is provided a system and method for a musical edutainment interface on a display for playing an electronic musical instrument having frets and strings. The system comprises a processor configured to be placed in communication with the display and the electronic musical instrument and a memory including a musical edutainment software, wherein the processor is configured to execute the musical edutainment software to present, on the display, the musical edutainment interface showing an edutainment musical performance to be followed by a user of the electronic musical instrument, to animate game objects falling vertically to indicate a timing of the edutainment musical performance, to place the game objects within fret areas to demonstrate a corresponding fretting configuration on the frets of the electronic musical instrument, and to align the game objects with a plurality of string lines to demonstrate a strumming of corresponding strings on the electronic musical instrument.

20 Claims, 4 Drawing Sheets

SYSTEM AND METHOD FOR PROVIDING AN EDUTAINMENT INTERFACE FOR MUSICAL INSTRUMENTS

BACKGROUND OF THE INVENTION

1. Field of the Invention

The present invention relates generally to educational entertainment. More particularly, the present invention relates to systems for processing performance data of musical instruments, such as electronic guitars, to provide an edutainment interface.

2. Background Art

Video games incorporating novel interaction paradigms beyond the traditional gamepad and joystick have enjoyed a recent surge of popularity. In particular, music simulation games using specially designed musical instrument simulation controllers have made a tremendous impact, with popular franchises such as Guitar Hero and Rock Band allowing players to live a virtual life as a rock star. By simply pushing buttons on a simulated guitar controller in response to on-screen cues, players can enjoy the thrills of performing a musical instrument in front of a live "virtual" audience.

However, because these simulated guitar controllers still rely on parts common to more traditional controllers, such as buttons and mechanical switches, the experience of playing on these guitar controllers is still far removed from actually playing a guitar or another musical instrument. Although gameplay on these guitar controllers may mimic a guitar performance to some degree, it cannot match the experience of using a real guitar, with proper strings and other essential elements of the guitar. Thus, although playing on these simulated instruments may be entertaining, they may not help improve the player's skill in playing a real musical instrument.

On the other hand, traditional musical edutainment software for learning musical instruments has enjoyed less success than their videogame simulation counterparts. Often written with a pedantic focus, traditional musical edutainment software typically sport drab aesthetics and repetitive drills using the same tired classical compositions. Thus it may come as no surprise that traditional musical edutainment software has largely failed to capture the interest of a new generation of budding musicians steeped in modern popular music culture and interactive entertainment. Compelling modern style and relevant musical content can bolster user compliance in an edutainment regimen, but traditional musical edutainment software often fails to integrate these elements, causing users to grow frustrated and lose interest.

Accordingly, there is a need to overcome the drawbacks and deficiencies in the art by providing a realistic musical instrument edutainment interface that advances and improves musical skills and is still fun to play, thus encouraging continued user compliance with an edutainment regimen.

SUMMARY OF THE INVENTION

There are provided systems and methods for providing an edutainment interface for musical instruments, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for providing a edutainment interface for musical instruments. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
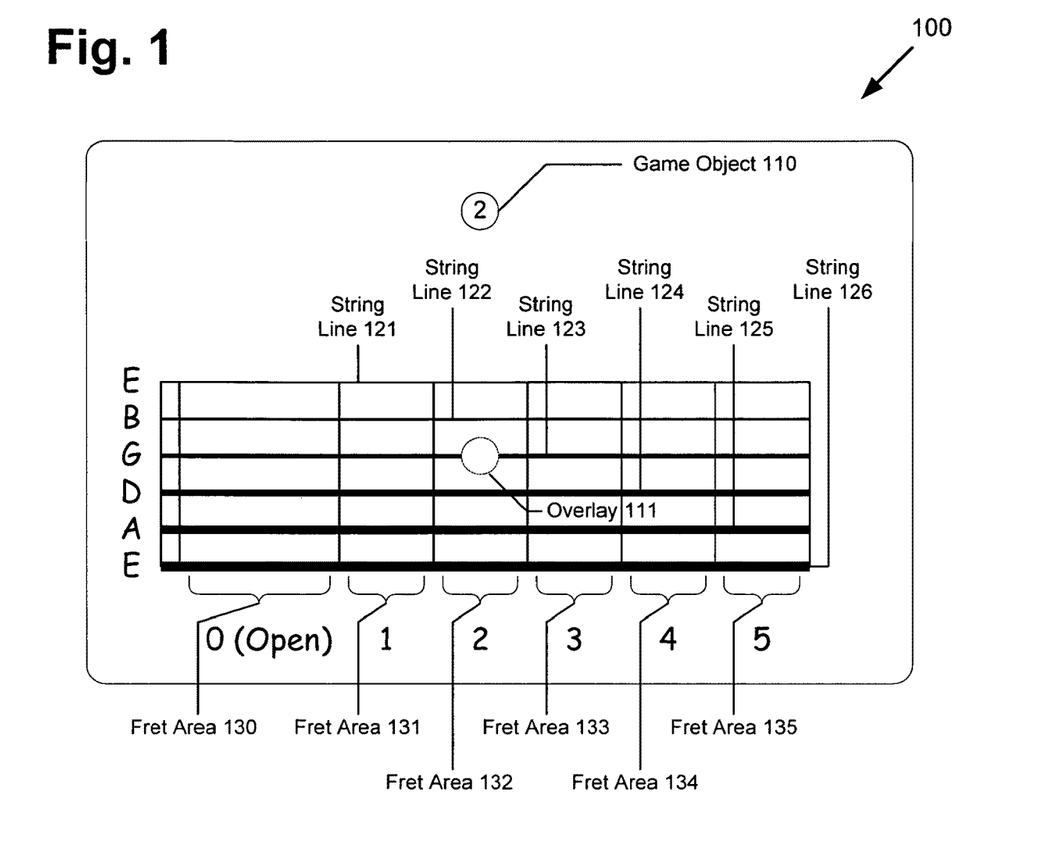
FIG. 1 presents a display of a musical edutainment interface, according to one embodiment of the present invention.

FIG. 1 presents a display of a musical edutainment interface, according to one embodiment of the present invention. Display 100 of FIG. 1 includes game object 110, overlay 111, string line 121, string line 122, string line 123, string line 124, string line 125, string line 126, fret area 130, fret area 131, fret area 132, fret area 133, fret area 134, and fret area 135.

FIG. 1 provides a broad overview of the elements in one embodiment of the musical edutainment interface. Display 100 depicts an abstraction of a guitar neck oriented horizontally towards the left, with the strings shown as horizontal lines of varying thickness as a visual aid. These lines might also be depicted in different colors to further enhance visual identification. The actual strings on a corresponding musical instrument might also vary in thickness as a tactile aid for the beginning musician. As shown by the labels, string line 121 corresponds to string E, string line 122 corresponds to string B, string line 123 corresponds to string G, string line 124 corresponds to string D, string line 125 corresponds to string A, and string line 126 corresponds to string E low.

Although display 100 depicts a six stringed guitar as the particular embodiment, alternate embodiments might include more or less strings to adapt to particular musical instruments. Additionally, support for alternative musical instruments might be implemented, for example fretted stringed instruments such as a banjo or ukulele.

Display 100 is also divided into regions labeled by numbers and divided by vertical fret lines. Fret area 130 corresponds to a open string, labeled 0 (Open), whereas fret area 131 corresponds to fret position 1, fret area 132 corresponds to fret position 2, fret area 133 corresponds to fret position 3, fret area 134 corresponds to fret position 4, and fret area 135 corresponds to fret position 5. Although only five frets are depicted in display 100, musical performances requiring more frets to be used might present a zoomed out display with more frets, such as in FIG. 3.

In FIG. 1, a virtual fretboard shown in display 100 is oriented in a traditional right-handed strumming orientation, with the fret areas ascending horizontally towards the right and the string lines arranged vertically such that the low E string corresponds to the bottom-most string line 126. However, alternative orientations may also be utilized to accommodate different strumming hands and user preferences. For example, to accommodate left-handed strumming, the interface might be configurable to horizontally flip the virtual fretboard such that the guitar neck is facing towards the right with fret areas ascending horizontally towards the left. Furthermore, to present a string ordering most natural for a particular user, the positions of the strings may be vertically mirrored such that the low E string instead corresponds to the top-most string line 121. In the vertically mirrored orientation, string line 121 corresponds to low E, string line 122 corresponds to A, string line 123 corresponds to D, string line 124 corresponds to G, string line 125 corresponds to B, and string line 126 corresponds to E. An example of this vertically mirrored orientation can be seen in display 350 of FIG. 3. Thus, by combining strumming handedness and string mirroring possibilities, the virtual fretboard can be oriented in at least four different configurations, including right-handed with normal strings, right-handed with mirrored strings, left-handed with normal strings, and left-handed with mirrored strings. A user may then select a particular virtual fretboard orientation as an interface preference.

To demonstrate a musical performance to be emulated on an electronic musical instrument, a series of game objects such as game object 110 falls from top to bottom on the screen indicating a timing for preparation of strumming, where alignment with overlay 111 indicates the timing of the strumming. Besides indicating the timing of notes, the game objects might indicate interaction with other parts of the musical instrument, such as, for example, a whammy bar. Once game object 110 aligns with overlay 111, a user strums the corresponding note on an electronic musical instrument connected to a processor driving display 100. In the situation depicted in FIG. 1, the user would fret string G at fret position 2 and strum string G on the electronic musical instrument at the moment game object 110 aligns with overlay 111. However, in alternative embodiments, the overlays may be omitted. The absence of overlays may provide a greater challenge for skilled users or conversely provide a less cluttered display to help users focus. Overlays might also be configurable to be switched on or off as a user preference.

Game object 110 may have various properties that may help a user identify a fretting configuration and prepare for strumming in order to accurately emulate the demonstrated musical performance. For example, game object 110 may indicate which fret it will be used with by a number label, which is shown in FIG. 1. Alternatively, game object 110 may indicate the string it is associated with, as in FIG. 3, or the resulting note that will be played. Matching the color of game object 110 with its corresponding string line or fret area might also help visual identification. For example, if string G is colored green, and game object 110 might also be colored green, helping the user identify the proper string. Alternatively, the area encompassed by fret area 132 might be tinted green, helping the user identify the proper fret.

Figure 2A:
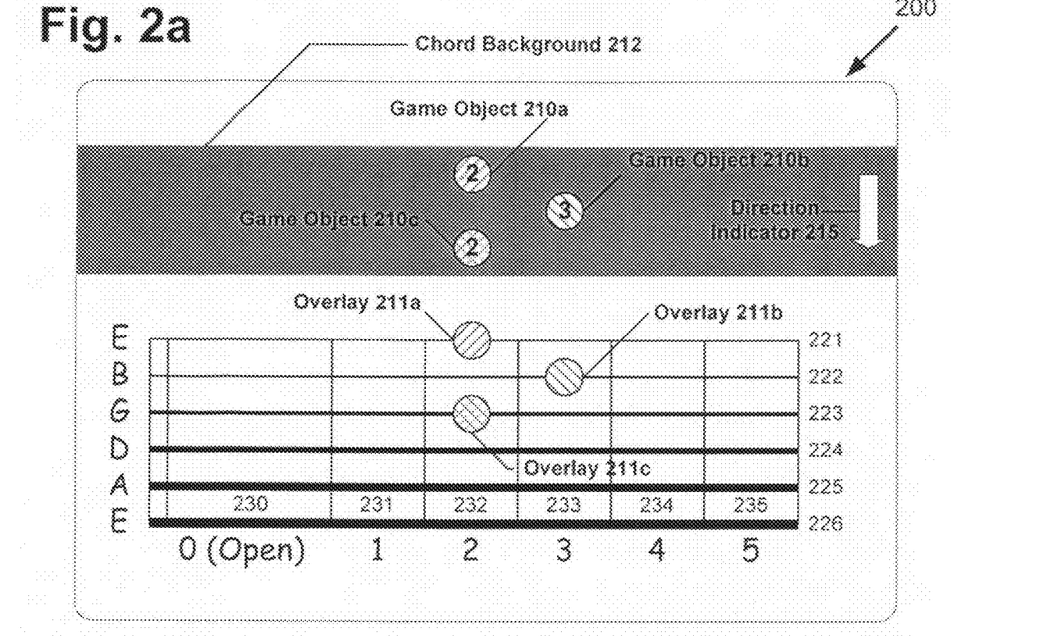
FIG. 2a and FIG. 2b present displays of a musical edutainment interface demonstrating an edutainment musical performance, according to one embodiment of the present invention.
Figure 2B:
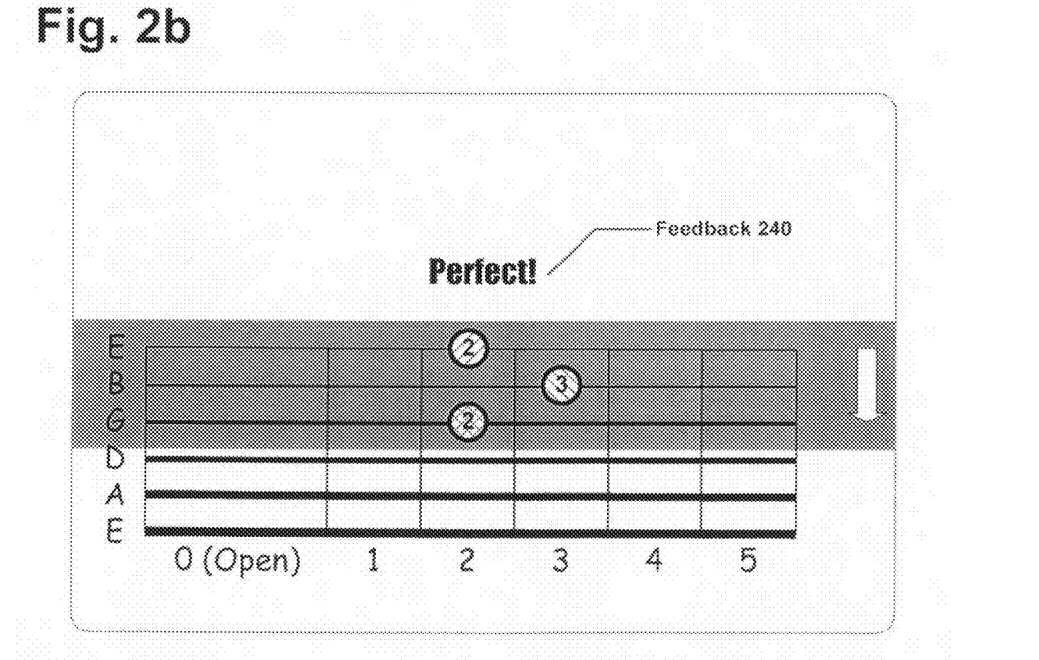

FIG. 2a and FIG. 2b present displays of a musical edutainment interface demonstrating an edutainment musical performance, according to one embodiment of the present invention. Display 200 of FIG. 2a includes game object 210a, game object 210b, game object 210c, overlay 211a, overlay 211b, overlay 211c, chord background 212, direction indicator 215, string line 221, string line 222, string line 223, string line 224, string line 225, string line 226, fret area 230, fret area 231, fret area 232, fret area 233, fret area 234, and fret area 235. FIG. 2b further includes feedback 240 and occurs after FIG. 2a in time.

Game object 210a, game object 210b, and game object 210c correspond to game object 110 from FIG. 1. Overlay 211a, overlay 211b, and overlay 211c correspond to overlay 111 from FIG. 1. String line 221 corresponds to string line 121 from FIG. 1. String line 222 corresponds to string line 122 from FIG. 1. String line 223 corresponds to string line 123 from FIG. 1. String line 224 corresponds to string line 124 from FIG. 1. String line 225 corresponds to string line 125 from FIG. 1. String line 226 corresponds to string line 126 from FIG. 1. Fret area 230 corresponds to fret area 130 from FIG. 1. Fret area 231 corresponds to fret area 131 from FIG. 1. Fret area 232 corresponds to fret area 132 from FIG. 1. Fret area 233 corresponds to fret area 133 from FIG. 1. Fret area 234 corresponds to fret area 134 from FIG. 1. Fret area 235 corresponds to fret area 135 from FIG. 1.

FIG. 2a differs from FIG. 1 in that multiple game objects are presented simultaneously as a chord. Chord background 212, shown as a gray bar, is provided to emphasize that game object 210a, game object 210b, and game object 210c will be played simultaneously as a chord during alignment with overlay 211a, overlay 211b, and overlay 211c. Furthermore, direction indicator 215, pointing downwards, indicates to the user that a downwards strum should be utilized. Thus, according to FIG. 2a, the user should perform a downwards strum of a D major over A chord, or the notes A, D, and F sharp, by fretting position 2 of string G, position 3 of string B, and position 2 of string E. Unused or muted strings might be dimmed out, as shown by string line 224, string line 225, and string line 226. If a string needs to be played without fretting, then a game object can be directed towards fret area 230, which represents an open string.

FIG. 2b shows the result of a user successfully creating a user musical performance that matches the edutainment musical performance shown on display 200. At or near the moment when the game objects align with the overlays, the user strums the correct chord on the electronic musical instrument. This action is translated into musical data, which is transmitted to the processor and checked against the original edutainment musical performance to evaluate the user. Assuming the user has played accurately, feedback similar to feedback 240 might be displayed to encourage the user, and other game variables might be adjusted such as a player score total. Additionally, the notes the user played might be amplified through an audio system, and a graphical effect might be applied to the game objects to indicate a successful performance, such as glowing, expanding, shooting sparks or stars, or some other effect. Incorrectly played notes or inaccurate timing might also provide different feedback, such as red X marks or messages such as "Too slow" or "Too fast."

Constructive suggestions might be made to the user, providing feedback adjusted to the skill level of the user, or the difficulty of the musical performance might be adjusted to compensate for user skill level. The musical performances might comprise short sequences or drills for practice lessons, radio length or full-length songs, or any other format conducive to musical skill building and user enjoyment. Additionally, the interface might also support more advanced techniques not illustrated in the Figures, such as barre chords, hammer-ons, and pull-offs by special indicator symbols or some other method. However, for purposes of brevity and clarity, a discussion for implementation of these techniques shall be omitted.

Figure 3:
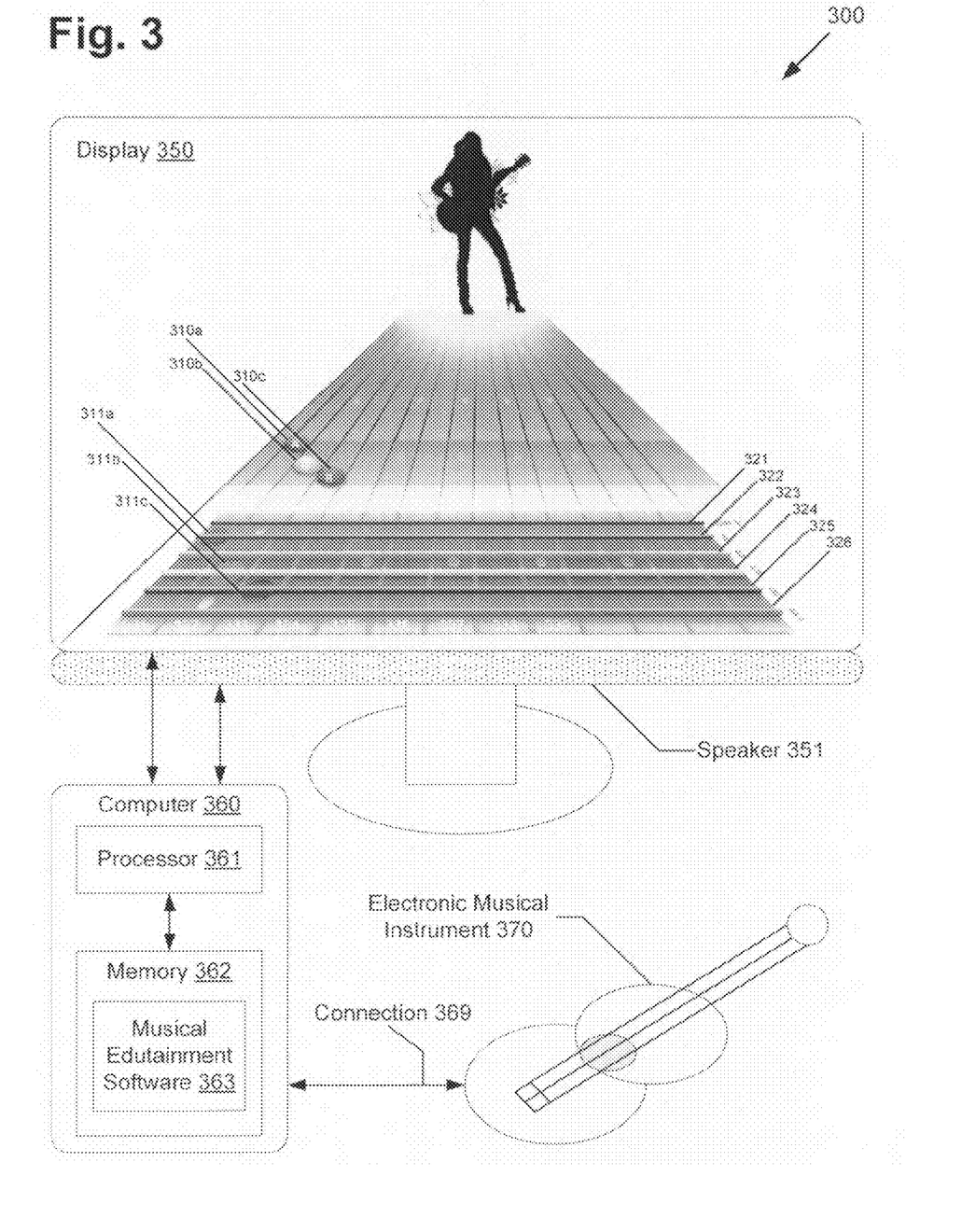
FIG. 3 presents a system for providing a musical edutainment interface, according to one embodiment of the present invention.

FIG. 3 presents a system for providing a musical edutainment interface, according to one embodiment of the present invention. Edutainment system 300 includes display 350, speaker 351, computer 360, connection 369, and electronic musical instrument 370. Computer 360 includes processor 361 and memory 362. Memory 362 includes musical edutainment software 363. Display 350 includes game object 310a, game object 310b, game object 310c, overlay 311a, overlay 311b, overlay 311c, string line 321, string line 322, string line 323, string line 324, string line 325, string line 326, fret area 331, fret area 332, fret area 333, fret area 334, fret area 335, fret area 336, fret area 337, fret area 338, and fret area 339. A fret area for an open string has been omitted from FIG. 3.

Game object 310a, game object 310b, and game object 310c correspond to game object 210a, game object 210b, and game object 210c from FIG. 2a, respectively. Overlay 311a, overlay 311b, and overlay 311c correspond to overlay 211a, overlay 211b, and overlay 211c from FIG. 2a, respectively. String line 321, string line 322, string line 323, string line 324, string line 325, and string line 326 correspond to string line 221, string line 222, string line 223, string line 224, string line 225, and string line 226 from FIG. 2a, respectively. However, unlike FIG. 2a where the string lines are arranged normally, the string lines in FIG. 3 correspond to a vertically mirrored string configuration, where the top-most string line 321 corresponds to a low E. Depending on user preference, a normal or mirrored string display may be more natural for string identification. Fret area 331, fret area 332, fret area 333, fret area 334, and fret area 335 correspond to fret area 231, fret area 232, fret area 233, fret area 234, and fret area 235 from FIG. 2a, respectively. Display 350 corresponds to display 200 from FIG. 2a.

An edutainment interface shown in display 350 utilizes a three-dimensional perspective view where game objects appear far away in the horizon and grow larger as they fall towards the bottom of the screen. The speed of the game objects determines the tempo of the edutainment musical performance. Although FIG. 3 only depicts one set of game objects, other embodiments may have a series of multiple sets of game objects comprising a complete musical composition rather than just a single note or chord, which may suffice for explanatory purposes.

Display 350 shows the same general concept as display 200 of FIG. 2a, with game objects falling towards the bottom of the screen and aligning with overlays positioned on particular string lines and fret areas. One difference between FIG. 3 and FIG. 2a is that the game objects indicate the string line to play, as indicated by the letter notes A, G, and B, rather than showing fret area numbers. These details might be customizable by the user to best suit the user's needs. For example, if the user has particular trouble identifying the strings, then the game objects might be configured as in FIG. 3 to help identify the correct strings. Although FIG. 3 is depicted in monochrome, on a color display, the game objects might also match the colors of the respective strings to help the user identify the correct strings.

Additionally, FIG. 3 includes a number of additional components to integrate the edutainment interface described so far into a broader system overview. FIG. 3 depicts display 350 as a Liquid Crystal Display (LCD) panel with an attached speaker 351, computer 360 as a desktop personal computer, and electronic musical instrument 370 as an electric guitar. By, for example, purchasing software at retail or by downloading from the Internet, the user can load musical edutainment software 363 into memory 362 of computer 360. Electronic musical instrument 370 might come as a bundle with musical edutainment software 363 or sold separately. Musical edutainment software 363 might also be configured to utilize any generic MIDI-compatible musical instrument, allowing greater peripheral flexibility.

Edutainment system 300 depicted in FIG. 3 only illustrates one particular embodiment of the present invention, and alternative embodiments might also be utilized. For example, computer 360 could also represent a videogame console or a videogame arcade cabinet. Display 350 could also be a Cathode Ray Tube (CRT) monitor or a plasma display. Electronic musical instrument 370 could be a number of other electronic musical instruments having frets and strings, such as a banjo or ukulele.

Once the user installs and executes musical edutainment software 363, display 350 might prompt the user to connect electronic musical instrument 370 to computer 360 using connection 369. Connection 369 could comprise, for example, a Universal Serial Bus (USB) cable, an IEEE 1394 (Firewire) cable, a wireless Bluetooth or WiFi connection, or another protocol. The data passed through this connection might also conform to the Musical Instrument Digital Interface (MIDI), a common protocol for electronic musical devices. Once connection 369 is established, the user interface may look similar to the edutainment interface shown in display 350. As the user strums and interacts with electronic musical instrument 370, the user musical performance is converted into digital data, formatted as MIDI data, and is passed through connection 369 to be interpreted by musical edutainment software 363, the software executing on processor 361 of computer 360.

Figure 4:
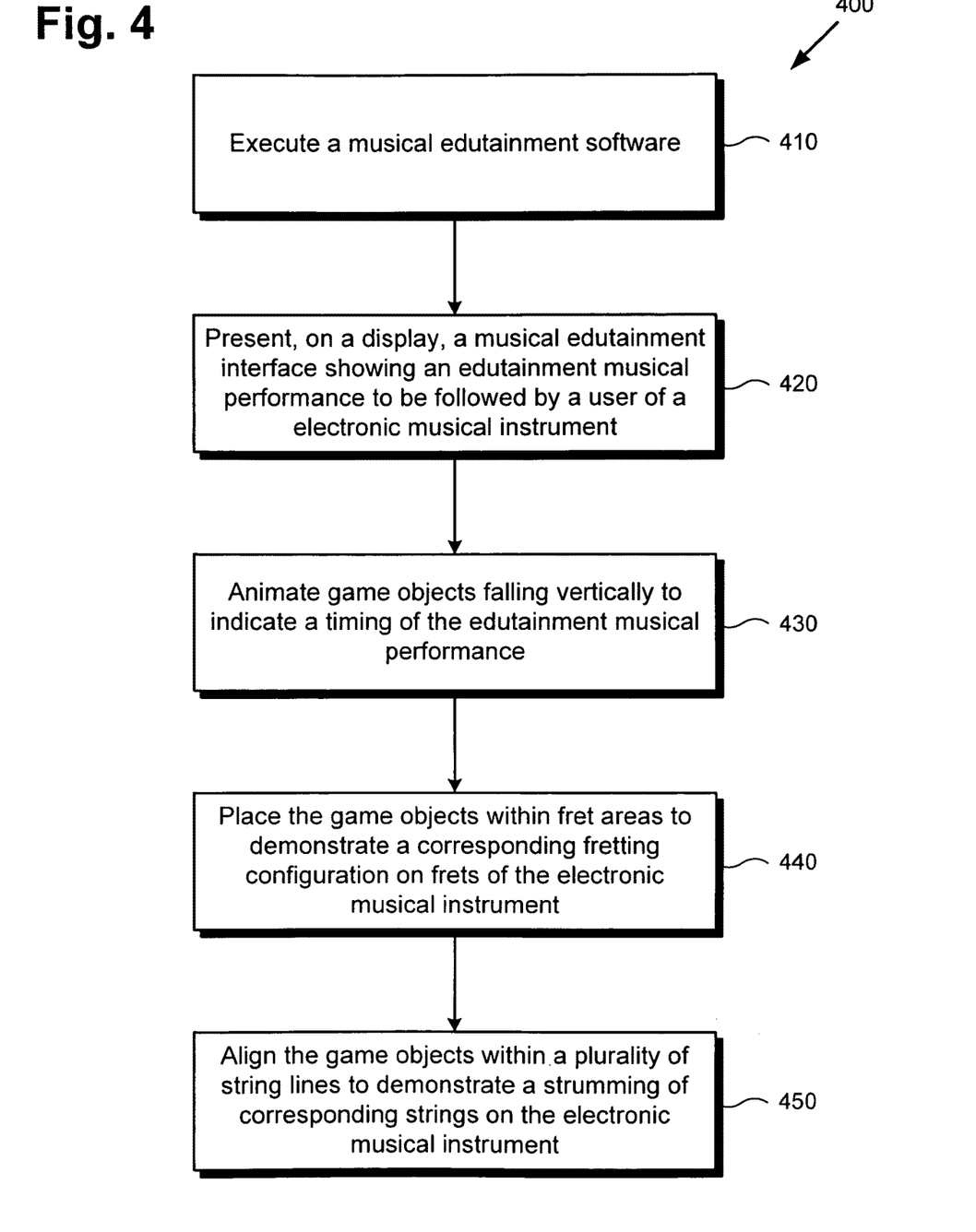
FIG. 4 shows a flowchart describing the steps, according to one embodiment of the present invention, by which a processor in communication with a display and an electronic musical instrument having frets and strings can provide a musical edutainment interface.

FIG. 4 shows a flowchart describing the steps, according to one embodiment of the present invention, by which a processor in communication with a display and an electronic musical instrument having frets and strings can provide a musical edutainment interface. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and edutainment system 300 of FIG. 3, step 410 of flowchart 400 comprises processor 361 executing musical edutainment software 363. This may be accomplished, for example, by processor 361 reading musical edutainment software 363 from memory 362 as shown in FIG. 3, processor 361 further interpreting the processor operations defined in edutainment software 363. Alternative embodiments might combine the functions of the processor and the memory into an integrated microcontroller, which may be optimal for a self-contained hardware and software solution. Step 410 allows processor 361 to execute the program logic needed for steps 420 to 450.

Referring to step 420 of flowchart 400 in FIG. 4 and edutainment system 300 of FIG. 3, step 420 of flowchart 400 comprises processor 361 presenting, on display 350, a musical edutainment interface showing an edutainment musical performance to be followed by a user of electronic musical instrument 370. At step 420, processor 361 presents a horizontally arranged plurality of string lines including string line 321, string line 322, string line 323, string line 324, string line 325, and string line 326, corresponding to the strings of electronic musical instrument 370. Additionally, processor 361 presents a plurality of vertical lines running through the plurality of string lines and providing fret areas 331 to 339 corresponding to the frets of electronic musical instrument 370. Game object 310a, game object 310b, and game object 310c show an edutainment musical performance to be followed by the user in the following steps.

Referring to step 430 of flowchart 400 in FIG. 4 and edutainment system 300 of FIG. 3, step 430 of flowchart 400 comprises processor 361 animating game objects 310a to 310c falling vertically to indicate a timing of the edutainment musical performance shown in step 420. The speed of the animation determines the tempo of the edutainment musical performance. Additionally, the game objects might also grow in size as they fall vertically, particularly in a three-dimensional perspective view as shown in display 350. This effect may aid the user in gauging the proper timing to follow the edutainment musical performance.

Referring to step 440 of flowchart 400 in FIG. 4 and edutainment system 300 of FIG. 3, step 440 of flowchart 400 comprises processor 361 placing the game objects from step 430 within fret areas. Thus, game object 310a is within fret area 331, game object 310b is within fret area 332, and game object 310c is within fret area 333. This demonstrates to the user that game object 310a should be played on the first fret, game object 310b should be played on the second fret, and game object 310c should be played on the third fret. Although not depicted in FIG. 3, one of the fret areas might be reserved as an open string, demonstrating to the user that no fretting is necessary for game objects placed in that fret area. Additionally, the game objects might be labeled with a number indicating the proper associated fret, as done in FIG. 2a. This additional labeling may provide a helpful visual aid for novice musicians unfamiliar with fret positions. In this manner, the user can prepare her fretting hand to assume the proper fretting configuration on a fingerboard of electronic musical instrument 370 by observing display 350.

Referring to step 450 of flowchart 400 in FIG. 4 and edutainment system 300 of FIG. 3, step 450 of flowchart 400 comprises processor 361 aligning the game objects from step 440 within the plurality of string lines shown from step 420 to demonstrate a strumming of corresponding strings on electronic musical instrument 370 while maintaining the fretting configuration from step 440. Thus, game object 310a aligns with string line 322, game object 310b aligns with string line 324, and game object 310c aligns with string line 325. This demonstrates to the user that game object 310a should be played on string A, game object 310b should be played on string G, and game object 310c should be played on string B. Step 450 should be carried out in combination with the fretting configuration of step 440 to produce the correct musical notes.

Additionally, there are several visual effects shown in FIG. 3 that processor 361 can utilize to help the user identify the proper string for a game object. For example, the game objects might be labeled with a letter note indicating the proper associated string. The colors of the game objects and their respective matching strings might also be matched. Transparent overlays might also indicate the position of alignment for a game object. As shown in FIG. 3, game object 310a aligns at overlay 311a, game object 310b aligns at overlay 311b, and game object 310c aligns at overlay 311c. Although not depicted in FIG. 3, another visual aid might be to progressively vary the string lines in thickness, as shown in FIG. 1. To further bolster the effectiveness of this visual aid, the actual strings on electronic musical instrument 370 might also correspondingly vary in thickness to help the user's strumming hand find the proper strings. Since electronic musical instrument 370 is not acoustic and may output sounds through speaker 351, any adverse changes to the sound can be readily avoided.

At this point, the musical edutainment interface has shown the user all the parameters necessary to follow an edutainment musical performance on electronic musical instrument 370, and flowchart 400 is complete. However, additional logic can be added to processor 361 via musical edutainment software 363 to support various gameplay and coaching mechanics, and to provide helpful feedback to the user for musical skill development.

Before processor 361 can act on such logic, it must first collect the results of the user playing on electronic musical instrument 370. The actions of the user in playing electronic musical instrument 370, such as fretting and strumming the strings, can be translated into digital data for transmission via connection 369 to processor 361. An embedded processor within electronic musical instrument 370 may provide this translation step, using the MIDI protocol as a standardized format for representing musical instrument actions as digital data. Sensors on the electronic musical instrument might detect fretting positions and vibration of strings as input data to be translated into MIDI data. The embedded processor then collects this translated MIDI data to comprise a user musical performance, which is forwarded via connection 369 to processor 361. As previously discussed, MIDI is chosen since it is a widely used standard, but other protocols could also be used.

Next, the user musical performance can be compared against the original edutainment musical performance by analyzing the collected MIDI data. In this step, processor 361 evaluates the musical skill of the user, gauging the accuracy of timing and whether the proper notes were played. For example, for each game object, any notes played within a short time window may be considered "perfect" timing and earns a maximum score, whereas a longer time window may be considered "good" timing and earns a medium score, and any notes played outside either of these time windows may be considered "bad" timing and earns no score. Additionally, notes that are played but are not presented as part of the edutainment musical performance of step 410 might be considered as misplayed notes, subtracting from score. One exception to this rule might be if the additional notes are judged harmless to the performance, such as extra open strings in a chord, for example.

Next, feedback might be provided based on the evaluation of the user musical performance. For example, if the user played all three notes perfectly, feedback 240 might be flashed on display 200 as indicated in FIG. 2b. As previously discussed, constructive feedback might also be provided to help improve the user's musical technique and skill. This feedback might be provided as the user plays, or after the entire edutainment musical performance is completed. In this manner, the user can steadily improve her musical skill using a realistic electronic musical instrument while enjoying a fun interactive experience provided by the edutainment interface.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for providing a musical edutainment interface on a display for playing an electronic musical instrument having frets and strings, the system comprising:
   a processor configured to be placed in communication with the display and the electronic musical instrument; and
   a memory including a musical edutainment software;
   wherein the processor is configured to execute the musical edutainment software to:
      present, on the display, the musical edutainment interface showing an edutainment musical performance to be followed by a user of the electronic musical instrument, the musical edutainment interface including:
         a plurality of string lines arranged horizontally and corresponding to the strings of the electronic musical instrument; and
         a plurality of vertical lines running through the plurality of string lines and providing fret areas corresponding to the frets of the electronic musical instrument;
      animate game objects falling vertically to indicate a timing of the edutainment musical performance;
      place the game objects within the fret areas to demonstrate a corresponding fretting configuration on the frets of the electronic musical instrument; and
      align the game objects with the plurality of string lines to demonstrate a strumming of the corresponding strings on the electronic musical instrument.

2. The system of claim 1, wherein the processor is further configured to:
   detect a user musical performance played on the electronic musical instrument;
   evaluate the user musical performance by comparing the user musical performance to the edutainment musical performance; and
   provide feedback to the user based on the evaluation.

3. The system of claim 1, wherein the processor is configured to match a color of a game object with a color of a string line to indicate the string line to be aligned with the game object.

4. The system of claim 1, wherein the processor is configured to place a transparent overlay of a game object on a string line to indicate the string line to be aligned with the game object.

5. The system of claim 1, wherein the processor is configured to present the fret areas with number labels, and wherein the processor is configured to display a number label on a game object to demonstrate a fretting configuration associated with the game object.

6. The system of claim 1, wherein the processor is configured to display a letter note on a game object to demonstrate a string line associated with the game object.

7. The system of claim 1, wherein the processor is configured to progressively vary the string lines in thickness as a visual identification aid, and wherein the strings of the electronic musical instrument correspondingly vary in thickness as a tactile identification aid.

8. The system of claim 1, wherein the processor is configured to display a shared transparent background to indicate concurrently performed game objects.

9. The system of claim 1, wherein the processor is configured to display a directional indicator symbol to indicate a direction of strumming.

10. The system of claim 1, wherein the processor is configured to increase a size of the game objects as the game objects fall vertically.

11. The system of claim 1, wherein the electronic musical instrument comprises an electric guitar.

12. The system of claim 1, wherein the processor is placed in communication with the electronic musical instrument by establishing a physical connection using the Universal Serial Bus (USB) standard, and wherein the processor interprets data received from the electronic musical instrument using the Musical Instrument Digital Interface (MIDI) protocol.

13. A method for a processor to provide a musical edutainment interface on a display for playing an electronic musical instrument having frets and strings, the processor configured to be placed in communication with the display, the electronic musical instrument, and a memory including a musical edutainment software, the method comprising:
   executing the musical edutainment software;
   presenting, on the display, the musical edutainment interface showing an edutainment musical performance to be followed by a user of the electronic musical instrument, the musical edutainment interface including:
      a plurality of string lines arranged horizontally and corresponding to the strings of the electronic musical instrument; and
      a plurality of vertical lines running through the plurality of string lines and providing fret areas corresponding to the frets of the electronic musical instrument;
   animating game objects falling vertically to indicate a timing of the edutainment musical performance;
   placing the game objects within the fret areas to demonstrate a corresponding fretting configuration on the frets of the electronic musical instrument; and
   aligning the game objects with the plurality of string lines to demonstrate a strumming of the corresponding strings on the electronic musical instrument.

14. The method of claim 13, further comprising the steps of:
   detecting a user musical performance played on the electronic musical instrument;
   evaluating the user musical performance by comparing the user musical performance to the edutainment musical performance; and
   providing feedback to the user based on the evaluation.

15. The method of claim 13, wherein the processor is configured to match a color of a game object with a color of a string line to indicate the string line to be aligned with the game object.

16. The method of claim 13, wherein the processor is configured to place a transparent overlay of a game object on a string line to indicate the string line to be aligned with the game object.

17. The method of claim 13, wherein the processor is configured to present the fret areas with number labels, and wherein the processor is configured to display a number label on a game object to demonstrate a fretting configuration associated with the game object.

18. The method of claim 13, wherein the processor is configured to progressively vary the string lines in thickness as a visual identification aid, and wherein the strings of the electronic musical instrument correspondingly vary in thickness as a tactile identification aid.

19. The method of claim 13, wherein the electronic musical instrument comprises an electric guitar.

20. The method of claim 13, wherein the processor is placed in communication with the electronic musical instrument by establishing a physical connection using the Universal Serial Bus (USB) standard, and wherein the processor interprets data received from the electronic musical instrument using the Musical Instrument Digital Interface (MIDI) protocol.

* * * * *